US012500375B2

(12) United States Patent
Okuda

(10) Patent No.: US 12,500,375 B2

(45) Date of Patent: Dec. 16, 2025

(54) CONNECTOR

(71) Applicant: Japan Aviation Electronics Industry, Limited, Tokyo (JP)

(72) Inventor: Katsumasa Okuda, Tualatin, OR (US)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 413 days.

(21) Appl. No.: 18/179,897

(22) Filed: Mar. 7, 2023

(65) Prior Publication Data

US 2023/0378689 A1 Nov. 23, 2023

Related U.S. Application Data

(60) Provisional application No. 63/343,725, filed on May 19, 2022.

(51) Int. Cl.

| | |
|---|---|
| ***H01R 13/62*** | (2006.01) |
| ***H01R 13/516*** | (2006.01) |
| ***H01R 13/627*** | (2006.01) |
| ***H01R 13/639*** | (2006.01) |
| *H01R 103/00* | (2006.01) |

(52) U.S. Cl.

CPC ....... *H01R 13/6271* (2013.01); *H01R 13/516* (2013.01); *H01R 13/639* (2013.01); *H01R 2103/00* (2013.01); *H01R 2201/26* (2013.01)

(58) Field of Classification Search

CPC .............. H01R 13/6271; H01R 13/516; H01R 13/639; H01R 2103/00; H01R 2201/26; H01R 13/502; H01R 13/635; H01R 13/641; H01R 13/6273; H01R 13/633; H01R 13/64

See application file for complete search history.

(56) References Cited

U.S. PATENT DOCUMENTS

| | | | |
|---|---|---|---|
| 2,117,298 | A | 5/1938 | Chirelstein |
| 4,548,455 | A | 10/1985 | Ezure |
| 5,011,424 | A | 4/1991 | Simmons |

(Continued)

FOREIGN PATENT DOCUMENTS

| | | |
|---|---|---|
| EP | 0738029 A1 | 10/1996 |
| JP | 2005353363 | 12/2005 |

OTHER PUBLICATIONS

European Search Report dated Oct. 11, 2023 in Application No. 23163546.7 is attached, 11 pages.

*Primary Examiner* — Truc T Nguyen

(74) *Attorney, Agent, or Firm* — MUNCY, GEISSLER, OLDS & LOWE, P.C.

(57) ABSTRACT

A connector includes a slider retained in a housing to be slidable along a fitting direction, and an elastic member disposed between a cover member and the slider and applying to the slider an elastic force acting along the fitting direction, the housing including a pair of lock pieces that are arranged to be spaced apart from each other in a first direction perpendicular to the fitting direction and that lock a fitting state between the connector and a counter connector by being fitted in the counter connector, the cover member having a pair of outer surfaces that are spaced apart from each other in a second direction perpendicular to both the fitting direction and the first direction and that are inclined to approach each other toward a rear end of the cover member.

10 Claims, 16 Drawing Sheets

(56) References Cited

U.S. PATENT DOCUMENTS

| | | | | |
|---|---|---|---|---|
| 5,941,737 | A * | 8/1999 | Sakai ................. | H01R 13/4223 439/752 |
| 2013/0122732 | A1* | 5/2013 | Blakborn ........... | H01R 13/6277 439/357 |
| 2014/0141637 | A1* | 5/2014 | Miyakawa ........... | H01R 13/639 439/246 |
| 2014/0154911 | A1* | 6/2014 | Matsumoto .......... | H01R 13/635 439/370 |
| 2015/0004828 | A1* | 1/2015 | Osada .................. | H01R 13/639 439/357 |
| 2015/0056841 | A1 | 2/2015 | Siwek et al. | |
| 2023/0109992 | A1* | 4/2023 | Karita ................ | H01R 43/0421 439/352 |
| 2023/0378689 | A1* | 11/2023 | Okuda ................. | H01R 13/641 |

* cited by examiner

CONNECTOR

BACKGROUND OF THE INVENTION

The present invention relates to a connector, particularly to a connector having an automatic incomplete-fitting rejection function with respect to a counter connector.

In an airbag system for vehicles, an electric signal is supplied to an ignition device to activate an inflator, whereupon an airbag is filled with gas generated from the inflator and thereby inflated. The electric signal used for activating the inflator is supplied to the ignition device through an electric wire when a connector joined with an end of the electric wire is fitted to a counter connector installed in the ignition device.

If the connector is not completely fitted with the counter connector and is in an incomplete fitting state such as a so-called half fitting state, it may be difficult to supply the electric signal to the ignition device and properly activate the airbag system. Accordingly, there has been developed a connector having a function of automatically rejecting such an incomplete fitting state.

For instance, JP 2005-353363 A discloses a connector 1 as shown in FIG. 37. A rear portion of a housing 2 is covered by a cover member 3, and two electric wires 4 are drawn from the cover member 3 to the rear of the connector 1.

As shown in FIG. 38, a slider 6 is disposed in the cover member 3 to be slidable with respect to the housing 2 and receives an elastic force acting forward, from a plate spring 7. The slider 6 has a pair of elastically deformable lock pieces 6A protruding toward a counter connector 8 situated in front of the slider 6, and restriction portions 2A of the housing 2 make contact with the inner sides of the lock pieces 6A so that the lock pieces 6A are prevented from deforming inward.

When the connector 1 is pushed toward the counter connector 8, as shown in FIG. 39, projections 6B of the lock pieces 6A interfere with the edge of a recessed portion 8A of the counter connector 8, so that the slider 6 slides with respect to the housing 2 against the elastic force of the plate spring 7, and owing to this, the lock pieces 6A are displaced from the restriction portions 2A of the housing 2. Consequently, the lock pieces 6A elastically deform inward whereby the interference between the projections 6B of the lock pieces 6A and the edge of the recessed portion 8A of the counter connector 8 is released, the slider 6 slides forward due to a restoring force of the plate spring 7, and the lock pieces 6A are inserted into the recessed portion 8A of the counter connector 8.

As a result, as shown in FIG. 40, the projections 6B of the lock pieces 6A are accommodated in a groove 8C formed at the inner peripheral surface of the recessed portion 8A of the counter connector 8, and contacts of the connector 1 that are coupled with ends of the electric wires 4 are electrically connected to contacts of the counter connector 8. Thus, the connector 1 and the counter connector 8 are completely fitted to each other.

In the state where the projections 6B of the lock pieces 6A are not completely accommodated in the groove 8C of the counter connector 8, if the operator releases the operator's hand from the connector 1 in the middle of pushing the connector 1 toward the counter connector 8, the connector 1 comes off the counter connector 8 due to the restoring force of the plate spring 7. Thus, an incomplete fitting state is automatically rejected.

However, if the connector 1 is pushed toward the counter connector 8 obliquely with respect to the fitting direction and, for instance, merely one of the pair of lock pieces 6A of the slider 6 is accommodated in the groove 8C of the counter connector 8 with the other lock piece 6A being not accommodated in the groove 8C, a large frictional force would be generated between the slider 6 and the counter connector 8. If this frictional force is larger than the restoring force of the plate spring 7, the connector 1 would not come off the counter connector 8 even when the operator releases the operator's hand from the connector 1, so that an incomplete fitting state would be maintained.

In recent years, there has been a tendency to install airbags not only in a steering wheel or a dashboard of a vehicle but in various places inside the vehicle, and when an ignition device is situated at a position that is hard to see for operators who manufacture the vehicle or carry out other operations such as inspections, the operators may need to fit the connector 1 to the counter connector 8 without direct visual observation, in other words, need to do so-called blind mating. In such cases, the connector 1 tends to be obliquely pushed toward the counter connector 8.

SUMMARY OF THE INVENTION

The present invention has been made to solve the conventional problem described above and is aimed at providing a connector that can prevent oblique fitting from easily occurring while having an automatic incomplete-fitting rejection function with respect to a counter connector.

A connector according to the present invention is a connector to be fitted to a counter connector by being moved frontward along a fitting direction, the connector comprising:

a contact coupled with an end of an electric wire;

a housing retaining the contact;

a cover member retaining a rear portion of the housing;

a slider retained in the housing to be slidable along the fitting direction; and an elastic member disposed between the cover member and the slider and applying to the slider an elastic force acting along the fitting direction, wherein the housing includes a pair of lock pieces that are arranged to be spaced apart from each other in a first direction perpendicular to the fitting direction and that lock a fitting state between the connector and the counter connector by being fitted in the counter connector, and the cover member has a pair of outer surfaces that are spaced apart from each other in a second direction perpendicular to both the fitting direction and the first direction and that are inclined to approach each other toward a rear end of the cover member.

DETAILED DESCRIPTION OF THE INVENTION

Figure 1:
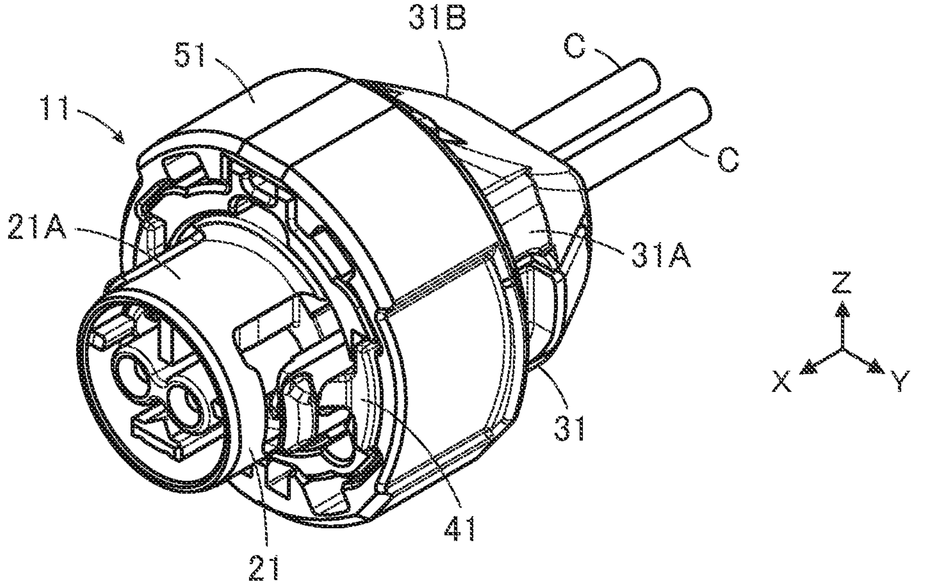
FIG. 1 is a perspective view showing a connector according to Embodiment 1.
Figure 2:
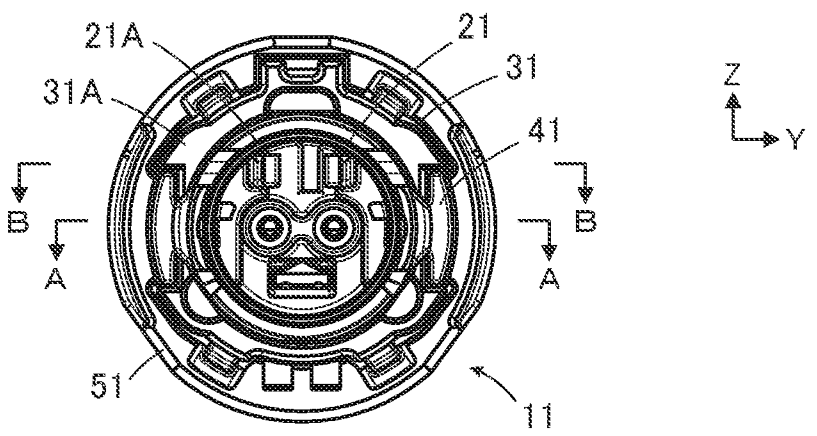
FIG. 2 is a front view showing the connector according to Embodiment 1.

Embodiments of the present invention are described below based on the accompanying drawings.

Embodiment 1

FIGS. 1 to 5 show a connector 11 according to Embodiment 1. The connector 11 includes a housing 21 and a cover member 31 holding a rear portion of the housing 21, and two electric wires C extend rearward from the rear end of the cover member 31 in parallel to each other. A slider 41 is disposed to be slidable with respect to the housing 21, and a collar member 51 is disposed outside the cover member 31 and the slider 41.

The housing 21 has a front tubular portion 21A extending frontward beyond the front end of the cover member 31. The cover member 31 includes: a body portion 31A situated behind the front tubular portion 21A of the housing 21; and a fitting force applying portion 31B closing the rear end of the body portion 31A and protruding rearward.

The fitting force applying portion 31B of the cover member 31 has a first outer surface 31C and a second outer surface 31D that are a pair of flat outer surfaces inclined to approach each other toward the rear end of the cover member 31. The two electric wires C extend rearward from between the first outer surface 31C and the second outer surface 31D.

A part of the slider 41 is exposed to a front of the cover member 31. The collar member 51 has a ring shape covering the outer peripheries of the cover member 31 and the slider 41.

For convenience, the direction from the two electric wires C toward the front tubular portion 21A of the housing 21 is called "+X direction," the direction in which the two electric wires C are arranged in parallel "Y direction," and the direction perpendicular to the X direction and the Y direction "Z direction."

The +X direction is a fitting direction of the connector 11.

The first outer surface 31C and the second outer surface 31D of the cover member 31 are arranged to be spaced apart from each other in the Z direction (second direction) and to be symmetrical with respect to an XY plane and are substantially identical in size. The first outer surface 31C forms a flat inclined surface facing the −X direction and the −Z direction, and the second outer surface 31D forms a flat inclined surface facing the −X direction and the +Z direction.

Outer surfaces inclined or curved toward the −X direction are also present at the opposite ends, in the Y direction, of the fitting force applying portion 31B protruding to the rear of the cover member 31. However, the first outer surface 31C and the second outer surface 31D spaced apart from each other in the Z direction are larger than the outer surfaces aligning in the Y direction and are substantially identical to each other in size, and are arranged to be symmetrical with respect to an XY plane; thus, the cover member 31 has such a shape as to urge the operator carrying out the fitting operation of the connector 11 to put the operator's fingers on the first outer surface 31C and the second outer surface 31D to push the connector 11 in the +X direction.

Figure 6:
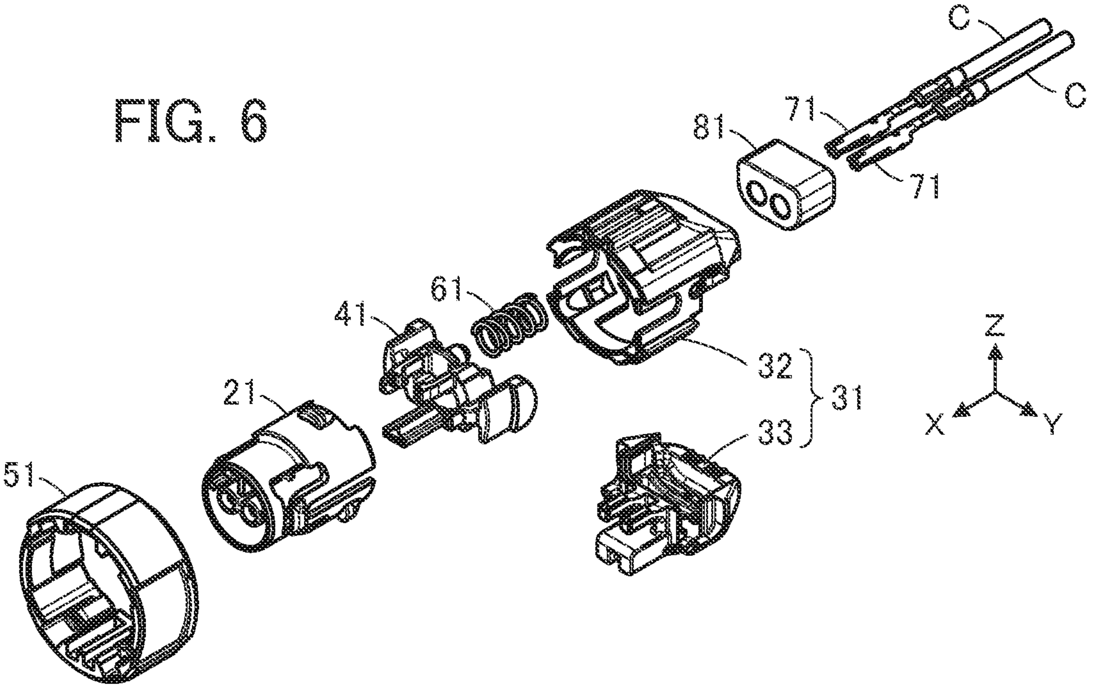
FIG. 6 is an exploded perspective view of the connector according to Embodiment 1.
Figure 7:
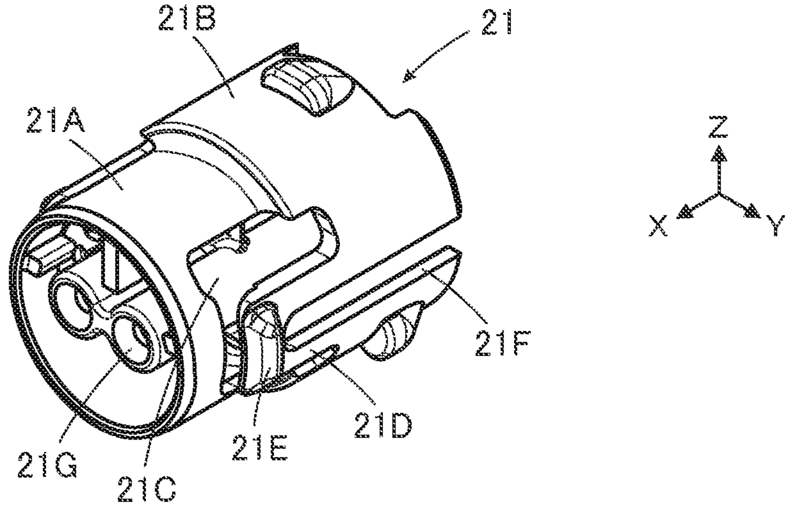
FIG. 7 is a perspective view showing a housing used in Embodiment 1.
Figure 8:
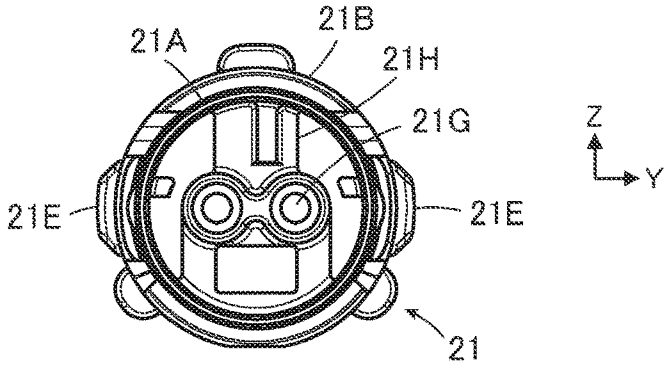
FIG. 8 is a front view showing the housing used in Embodiment 1.
Figure 9:
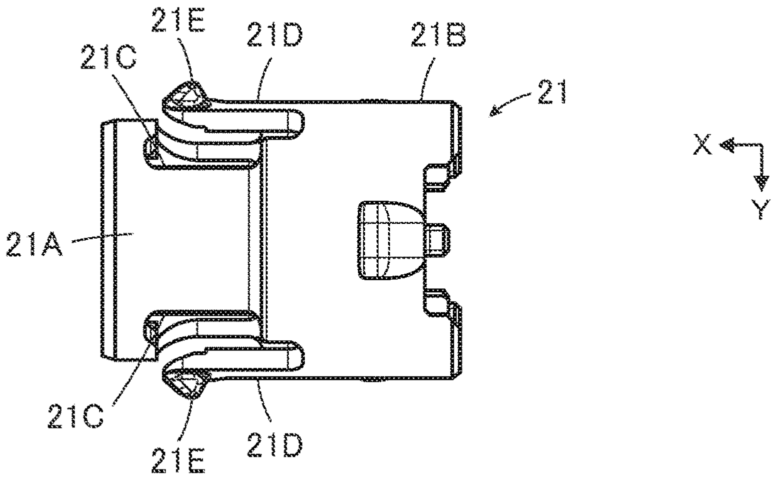
FIG. 9 is a plan view showing the housing used in Embodiment 1.
Figure 10:
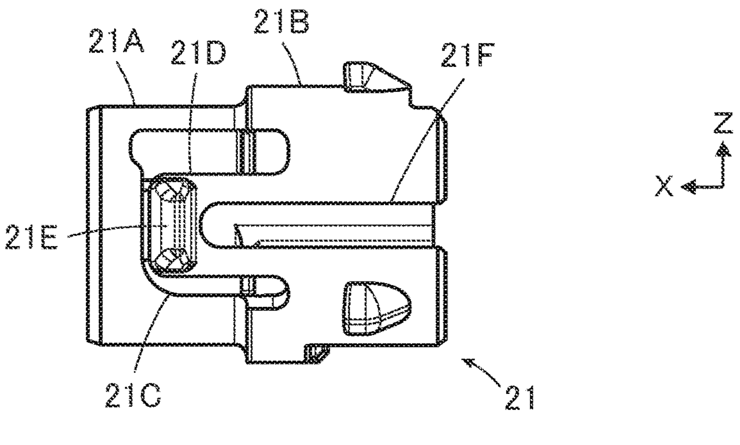
FIG. 10 is a side view showing the housing used in Embodiment 1.

FIG. 6 shows an exploded perspective view of the connector 11. The cover member 31 is formed by joining together a first cover 32 and a second cover 33 that are disposed on the opposite sides, in the Z direction, of the two electric wires C extending in the X direction to sandwich the two electric wires C therebetween.

The slider 41 is retained in the housing 21 to be slidable in the X direction that is the fitting direction, and an elastic member 61 constituted of a coil spring is disposed between the first cover 32 and the slider 41. The elastic member 61 serves to exert an elastic force on the slider 41 along the X direction.

Socket-type contacts 71 made of a conductive material and retained in the housing 21 are separately connected to the +X directional ends of the two electric wires C. Further, a ferrite member 81 having two through-holes extending in the X direction and arranged in the Y direction is retained in the cover member 31. The ferrite member 81 allows the two electric wires C coupled with the contacts 71 to pass through the two through-holes and provides electromagnetic shielding thereto.

As shown in FIGS. 7 to 10, the housing 21 is made of an insulating material such as resin and has such a shape that the front tubular portion 21A occupying a +X direction-side portion of the housing 21 and a rear tubular portion 21B occupying a −X direction-side portion of the housing 21 and being larger in diameter than the front tubular portion 21A are joined to be coaxial along the X direction.

Openings 21C are formed separately in lateral portions of the front tubular portion 21A on the +Y direction side and the −Y direction side. A pair of lock pieces 21D are formed to extend frontward along the fitting direction, i.e., toward the +X direction, separately from the +Y direction-side end and the −Y direction-side end of the rear tubular portion 21B on the outside of the front tubular portion 21A. These lock pieces 21D are spaced apart from each other in the Y direction (first direction) and formed to be elastically deformable in the Y direction, and are each disposed outside the corresponding opening 21C of the front tubular portion 21A. Each lock piece 21D is provided at its +X directional end with a projection 21E projecting outward from the housing 21 in the Y direction.

Further, cutouts 21F extending in the X direction are formed separately in lateral portions of the rear tubular portion 21B on the +Y direction side and the −Y direction side. These cutouts 21F extend to and in the pair of lock pieces 21D.

The housing 21 is provided in its inside with two contact accommodating portions 21G extending in the X direction in parallel, and further with a leg portion deformation portion 21H having a predetermined width in the Y direction at a boundary portion between the front tubular portion 21A and the rear tubular portion 21B.

Figure 11:
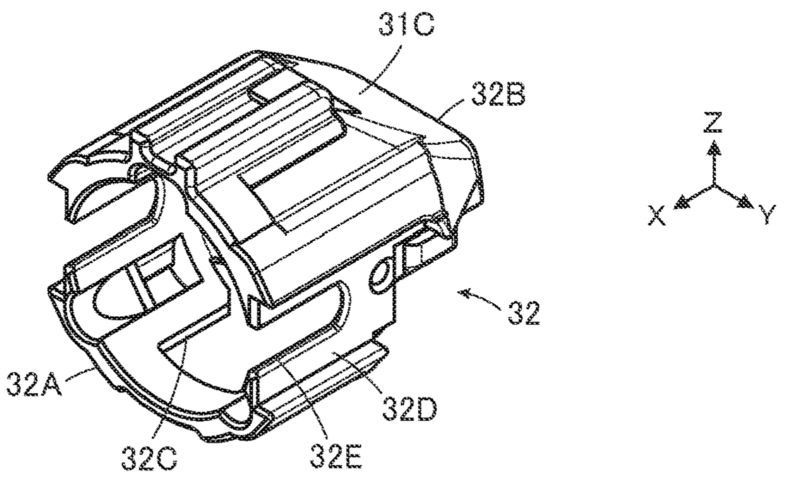
FIG. 11 is a perspective view showing a first cover used in Embodiment 1.
Figure 12:
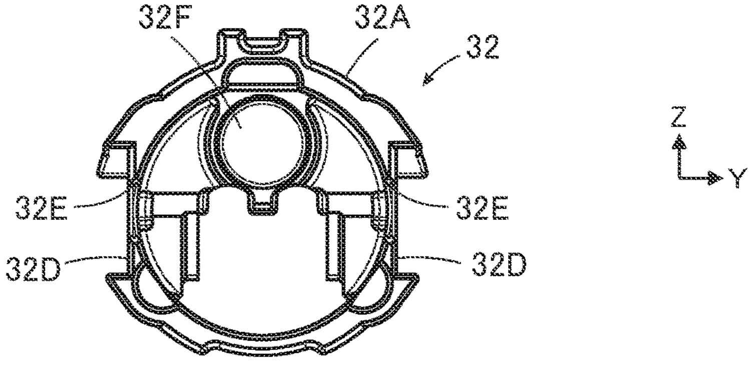
FIG. 12 is a front view showing the first cover used in Embodiment 1.
Figure 13:
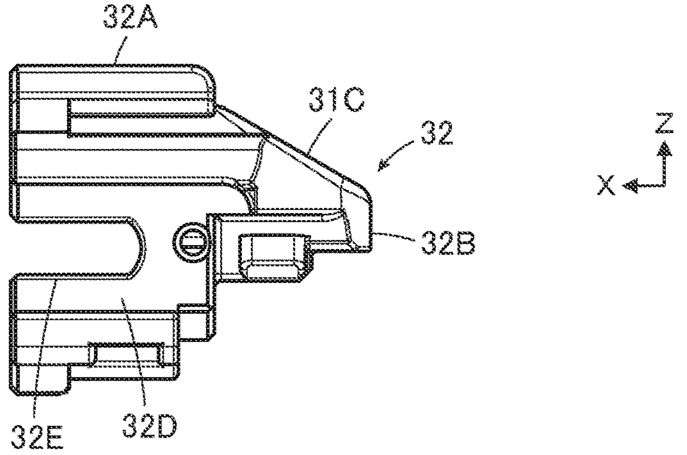
FIG. 13 is a side view showing the first cover used in Embodiment 1.

As shown in FIGS. 11 to 13, the first cover 32 made of an insulating material such as resin includes a tubular portion 32A extending in the X direction and a first overhang portion 32B joined to the +Z direction side of the −X directional end of the tubular portion 32A and overhanging in the −X direction. The first overhang portion 32B is provided with the first outer surface 31C.

A cutout 32C opening in the −X direction and extending in the X direction is formed at the −Z directional end of the tubular portion 32A, grooves 32D extending in the X direction are formed separately in outside portions of the tubular portion 32A on the +Y direction side and −Y direction side, and cutouts 32E opening in the +X direction and extending in the X direction are formed separately in the bottoms of the grooves 32D.

An elastic member retaining portion 32F facing the +X direction is formed inside the first cover 32.

Figure 14:
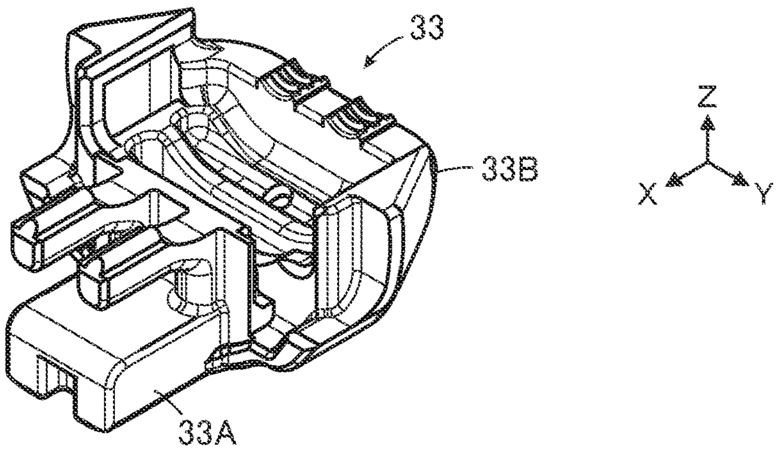
FIG. 14 is a perspective view showing a second cover used in Embodiment 1.
Figure 15:
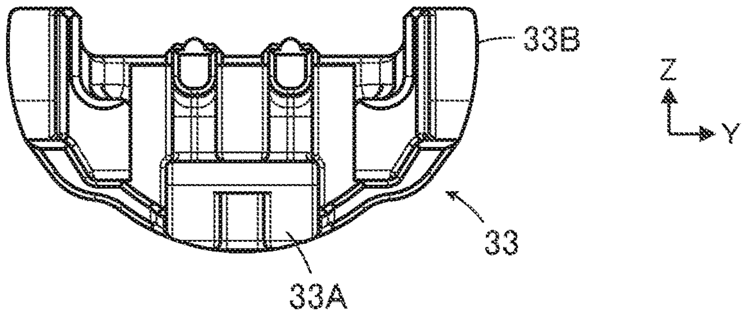
FIG. 15 is a front view showing the second cover used in Embodiment 1.
Figure 16:
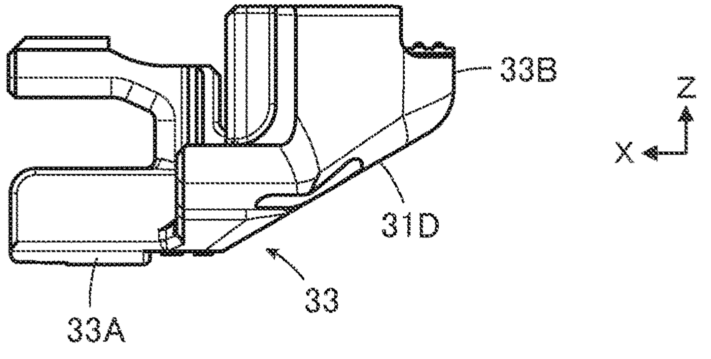
FIG. 16 is a side view showing the second cover used in Embodiment 1.
Figure 17:
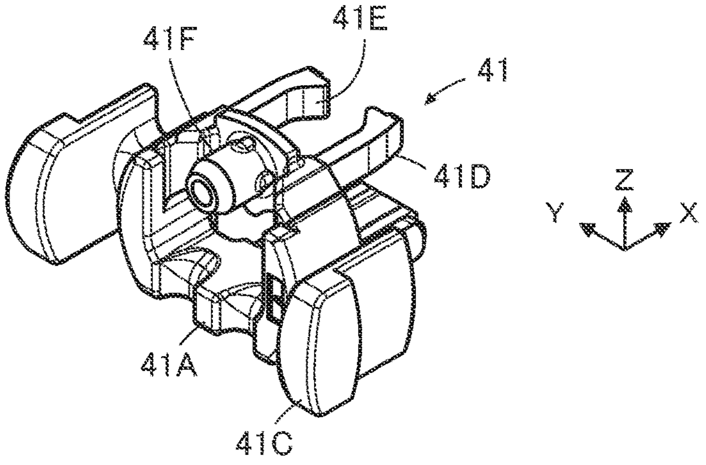
FIG. 17 is a perspective view of a slider used in Embodiment 1, as viewed obliquely from the rear.
Figure 18:
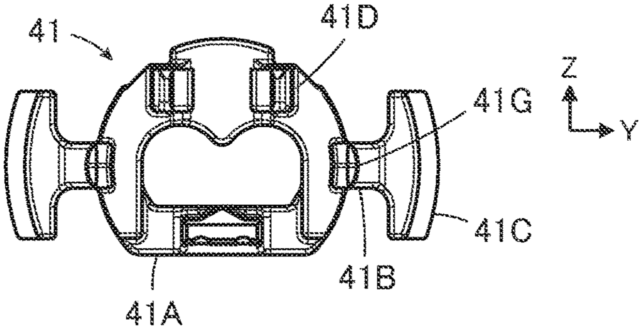
FIG. 18 is a front view showing the slider used in Embodiment 1.
Figure 19:
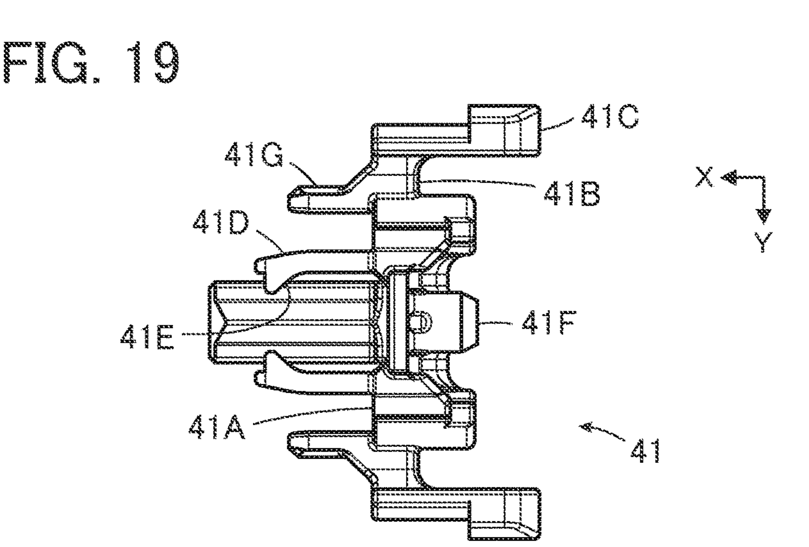
FIG. 19 is a plan view showing the slider used in Embodiment 1.
Figure 20:
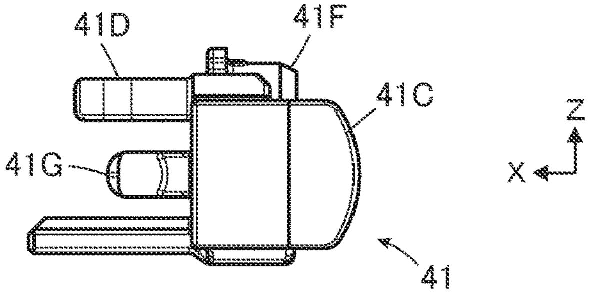
FIG. 20 is a side view showing the slider used in Embodiment 1.

As shown in FIGS. 14 to 16, the second cover 33 made of an insulating material such as resin includes a flat portion 33A extending along an XY plane and a second overhang portion 33B joined to the −X directional end of the flat portion 33A and overhanging in the −X direction. The second overhang portion 33B is provided with the second outer surface 31D.

As shown in FIGS. 17 to 20, the slider 41 made of an insulating material such as resin includes a slider body 41A, a pair of arm portions 41B extending separately in the +Y direction and −Y direction from the slider body 41A, and a pair of grip portions 41C extending in the −X direction from the tips of the pair of arm portions 41B.

A pair of leg portions 41D separately extend in the +X direction from the slider body 41A. The pair of leg portions 41D are spaced apart from each other in the Y direction, are elastically deformable in the Y direction, and are provided with a pair of inclined surfaces 41E facing each other with a distance therebetween getting narrower toward their +X directional ends. The base portions, on the −X direction side, of the pair of leg portions 41D have a distance therebetween that is larger than the width, in the Y direction, of the leg portion deformation portion 21H of the housing 21, and the +X directional ends of the pair of inclined surfaces 41E have a distance therebetween that is slightly smaller than the width, in the Y direction, of the leg portion deformation portion 21H of the housing 21.

Further, an elastic member retaining portion 41F is formed to protrude in the −X direction from the slider body 41A, and a pair of blocking beams 41G extend in the +X direction separately from the +Y directional end and the −Y directional end of the slider body 41A.

Figure 21:
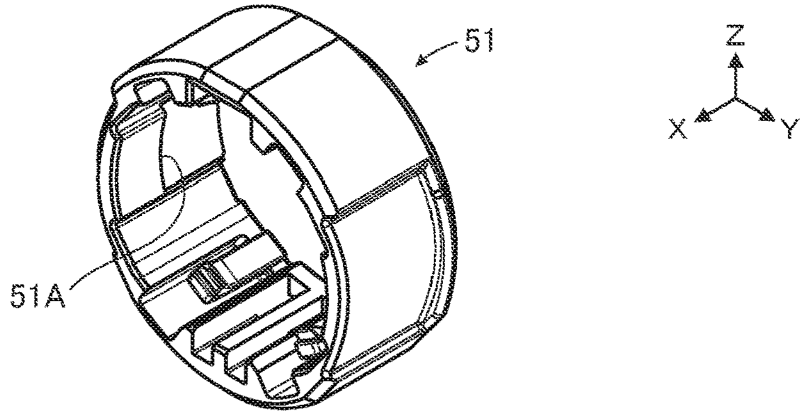
FIG. 21 is a perspective view showing a collar member used in Embodiment 1.

As shown in FIG. 21, the collar member 51 has a ring shape extending to form a substantially circular shape along a YZ plane. The inner periphery of the collar member 51 is provided with a pair of step portions 51A facing each other in the Y direction. These step portions 51A are to catch on the grip portions 41C of the slider 41 and are configured to allow the slider 41 to slide in the −X direction along with the collar member 51.

The connector 11 can be assembled in the following manner.

First, the pair of arm portions 41B of the slider 41 are inserted into the cutouts 21F of the housing 21 and the cutouts 32E of the first cover 32, the elastic member 61 is disposed between the elastic member retaining portion 32F of the first cover 32 and the elastic member retaining portion 41F of the slider 41, and the ferrite member 81 is disposed between the first cover 32 and the second cover 33.

Next, the rear tubular portion 21B of the housing 21 is covered with the first cover 32, and the first cover 32 and the second cover 33 are joined to each other to thereby form the cover member 31. Finally, the collar member 51 is fitted onto the outer peripheries of the cover member 31 and the slider 41. Thus, the assembling operation of the connector 11 is completed.

It is assumed that the two electric wires C coupled with the contacts 71 have been already passed through the two through-holes of the ferrite member 81. The contacts 71 are accommodated in the contact accommodating portions 21G of the housing 21.

The slider 41 is retained to be slidable in the X direction with respect to the housing 21 and the cover member 31 while receiving an elastic force acting in the +X direction from the elastic member 61 with the pair of grip portions 41C being accommodated in the grooves 32D of the first cover 32.

Figure 22:
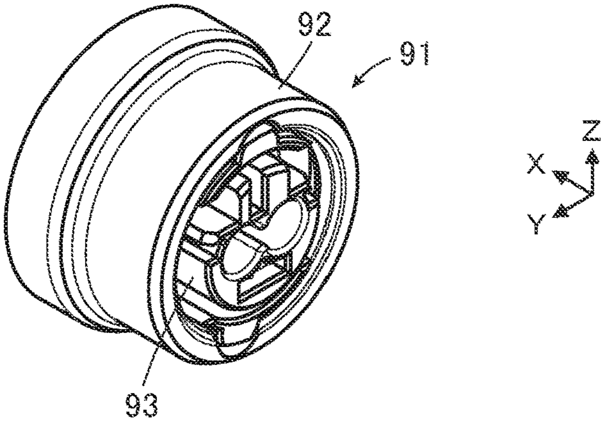
FIG. 22 is a perspective view showing a counter connector.
Figure 23:
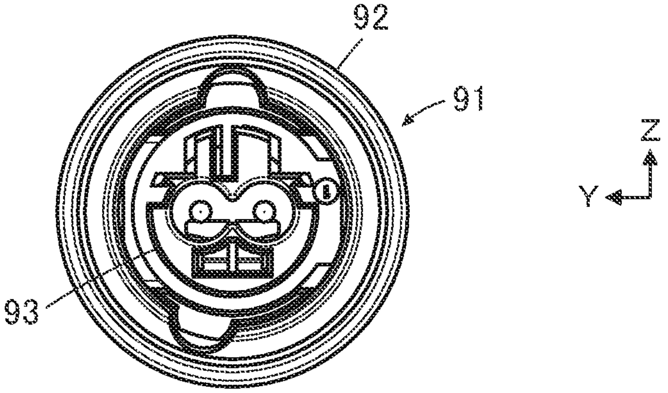
FIG. 23 is a front view showing the counter connector.

FIGS. 22 and 23 show a counter connector 91 to which the connector 11 thus configured is fitted. The counter connector 91 includes, for instance, an inflator 92 that constitutes a part of an airbag system, and a retainer 93 disposed inside the inflator 92.

Figure 24:
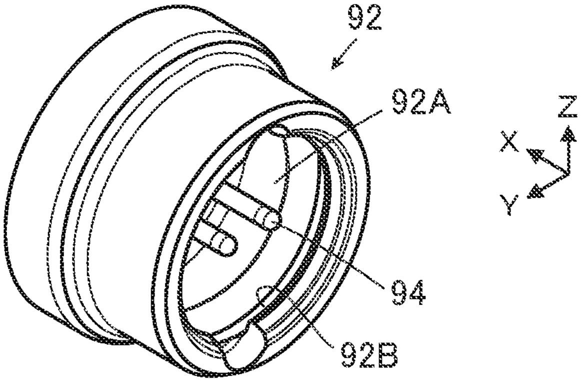
FIG. 24 is a perspective view showing an inflator of the counter connector.
Figure 25:
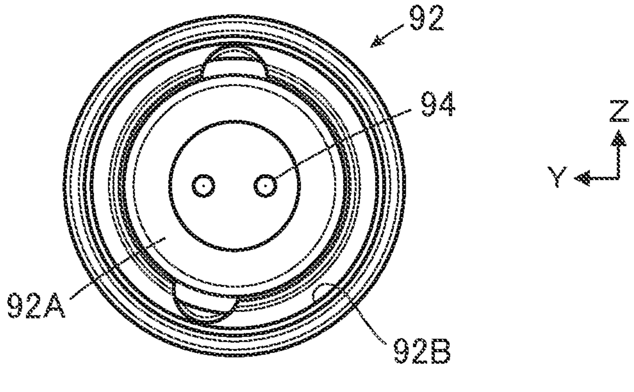
FIG. 25 is a front view showing the inflator of the counter connector.

As shown in FIGS. 24 and 25, the inflator 92 includes a connector accommodating portion 92A of recess shape into which a part of the connector 11 is to be inserted, and a groove 92B is formed at the inner peripheral surface of the connector accommodating portion 92A. This groove 92B is provided to accommodate the projections 21E of the lock pieces 21D of the housing 21 when the connector 11 is fitted to the counter connector 91.

The connector accommodating portion 92A is provided in its interior with two pin-type contacts 94 extending in the −X direction and spaced apart from each other in the Y direction.

Figure 26:
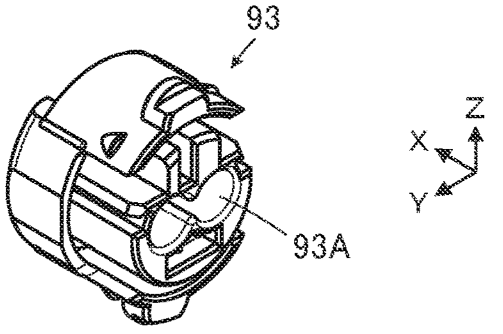
FIG. 26 is a perspective view showing a retainer of the counter connector.
Figure 27:
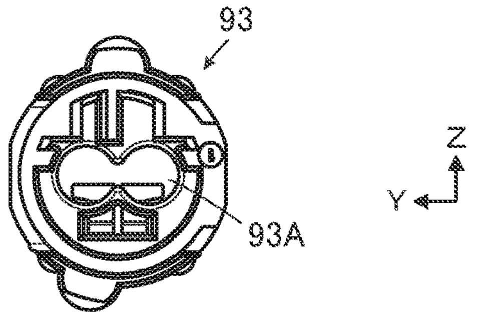
FIG. 27 is a front view showing the retainer of the counter connector.

As shown in FIGS. 26 and 27, the retainer 93 made of an insulating material such as resin includes a through-hole 93A penetrating the retainer 93 in the X direction and allowing the two pin-type contacts 94 to pass therethrough.

Next, the fitting operation of the connector 11 to the counter connector 91 is described.

Figure 28:
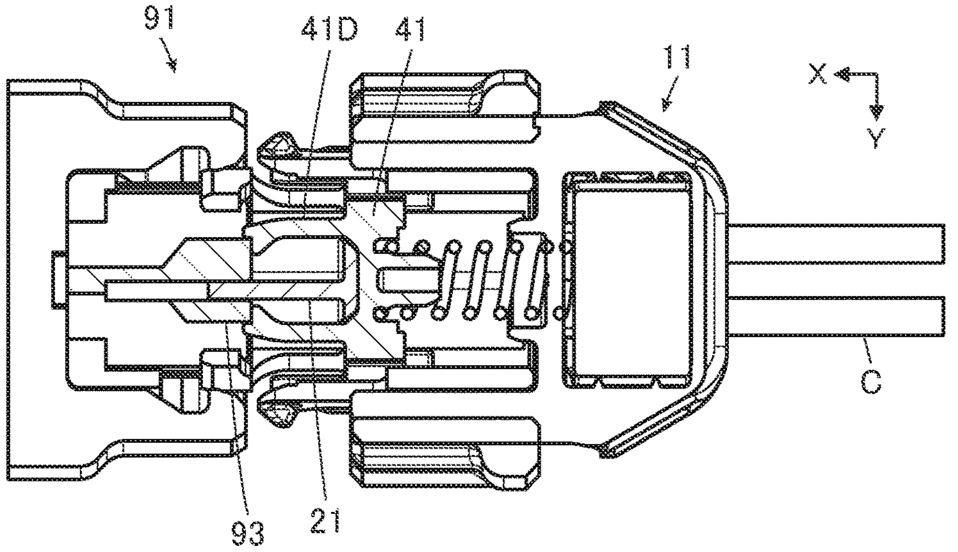
FIG. 28 is a cross-sectional view showing the connector according to Embodiment 1 and the counter connector at the start of fitting in a cross section corresponding to line B-B of FIG. 2.
Figure 29:
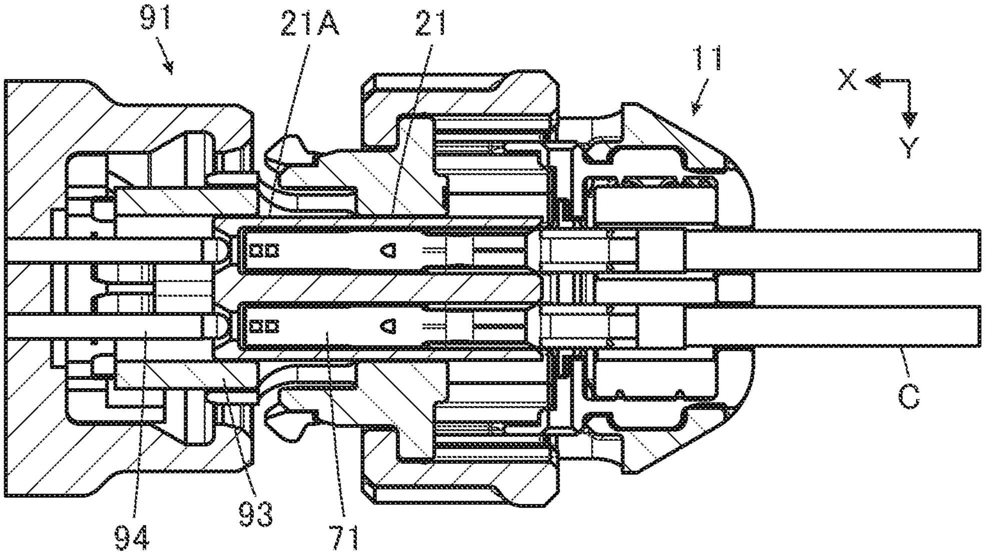
FIG. 29 is a cross-sectional view showing the connector according to Embodiment 1 and the counter connector at the start of fitting in a cross section corresponding to line A-A of FIG. 2.

First, when the connector 11 is moved toward the counter connector 91 in the +X direction that is the fitting direction, the tips, i.e., the +X directional ends of the pair of leg portions 41D of the slider 41 abut on the retainer 93 as shown in FIG. 28, and the front tubular portion 21A of the housing 21 starts to be inserted into the retainer 93 of the counter connector 91 as shown in FIG. 29. At this time, the contacts 71 of the connector 11 do not make contact with the contacts 94 of the counter contacts 91 yet.

Figure 30:
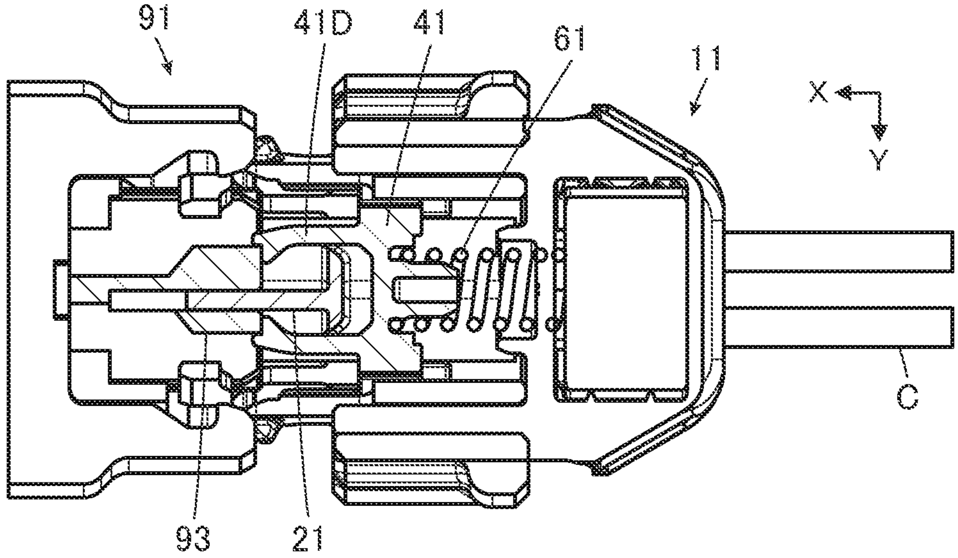
FIG. 30 is a cross-sectional view showing the connector according to Embodiment 1 and the counter connector in the initial stage of fitting in a cross section corresponding to line B-B of FIG. 2.
Figure 31:
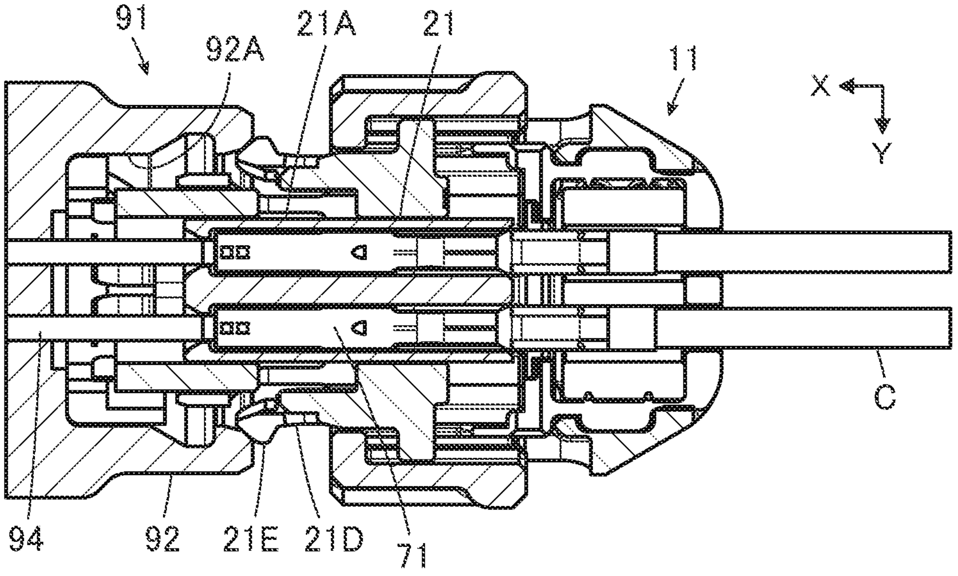
FIG. 31 is a cross-sectional view showing the connector according to Embodiment 1 and the counter connector in the initial stage of fitting in a cross section corresponding to line A-A of FIG. 2.

When the connector 11 is further moved in the +X direction, since the tips of the pair of leg portions 41D of the slider 41 abut on the retainer 93, the slider 41 starts to slide with respect to the housing 21 while compressing the elastic member 61 with the X directional position of the slider 41 with respect to the counter connector 91 being unchanged, as shown in FIG. 30. At this time, the lock pieces 21D of the housing 21 start to be inserted into the connector accommodating portion 92A of the inflator 92, and the contacts 71 of the connector 11 and the contacts 94 of the counter connector 91 start contacting each other, as shown in FIG. 31.

Figure 32:
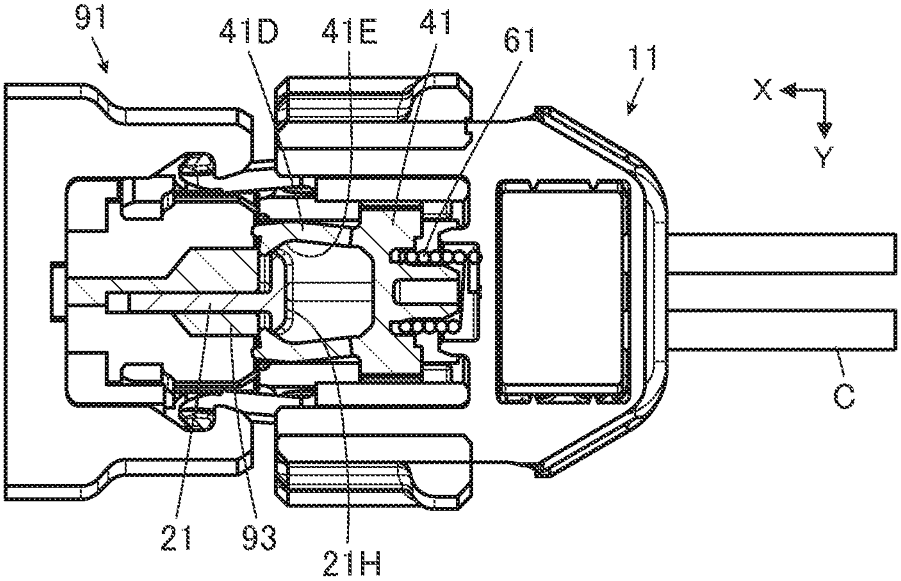
FIG. 32 is a cross-sectional view showing the connector according to Embodiment 1 and the counter connector immediately before completion of fitting in a cross section corresponding to line B-B of FIG. 2.
Figure 33:
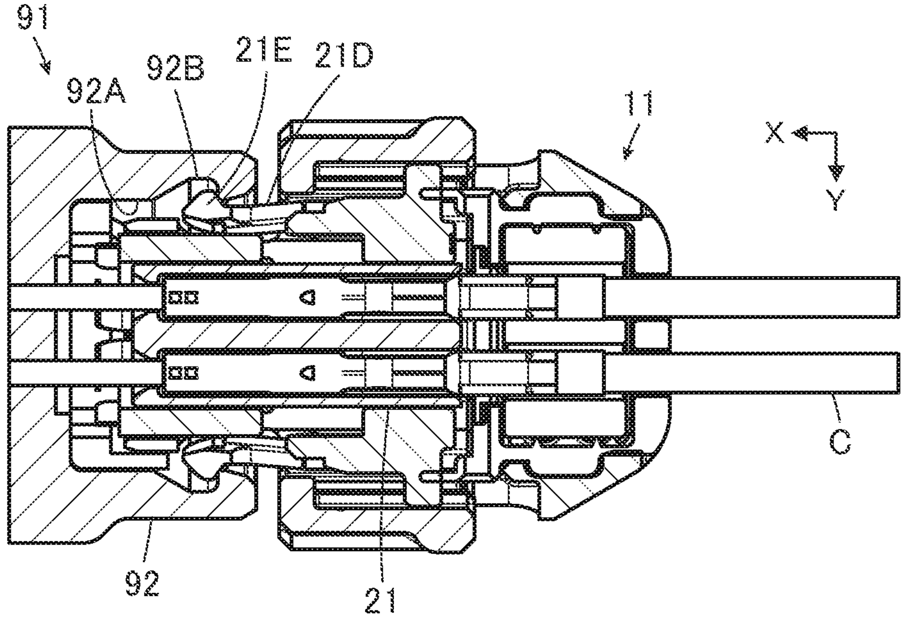
FIG. 33 is a cross-sectional view showing the connector according to Embodiment 1 and the counter connector immediately before completion of fitting in a cross section corresponding to line A-A of FIG. 2.

In this state, when the connector 11 is further moved in the +X direction, the leg portion deformation portion 21H of the housing 21 comes into contact with the inclined surfaces 41E of the pair of leg portions 41D of the slider 41 and starts to widen the distance between the pair of leg portions 41D in the Y direction, as shown in FIG. 32. The distance between the tips of the pair of leg portions 41D in the Y direction gradually increases as the connector 11 is moved in the +X direction. Further, at this time, the lock pieces 21D of the housing 21 are inserted into the connector accommodating portion 92A of the inflator 92, and the projections 21E of the lock pieces 21D start to be accommodated in the groove 92B of the connector accommodating portion 92A, as shown in FIG. 33.

Figure 34:
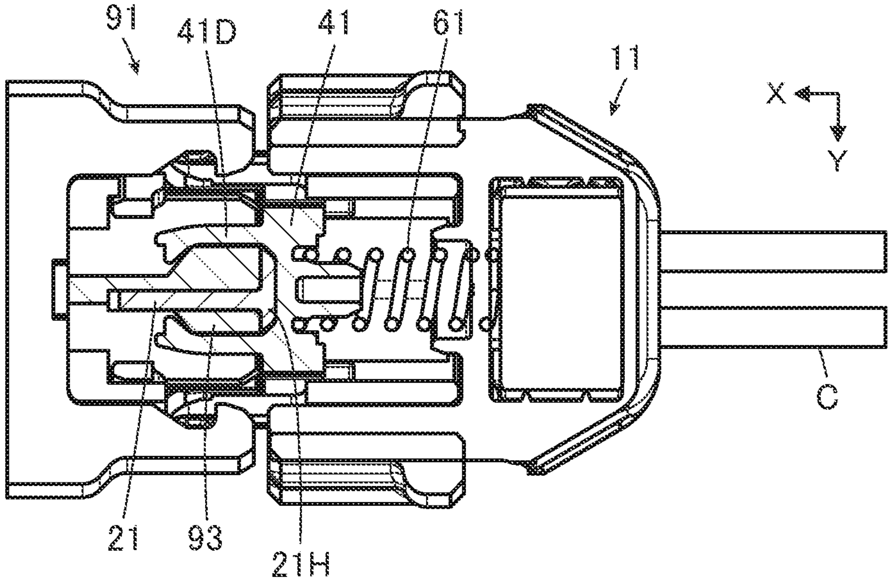
FIG. 34 is a cross-sectional view showing the connector according to Embodiment 1 and the counter connector when fitting is completed in a cross section corresponding to line B-B of FIG. 2.
Figure 35:
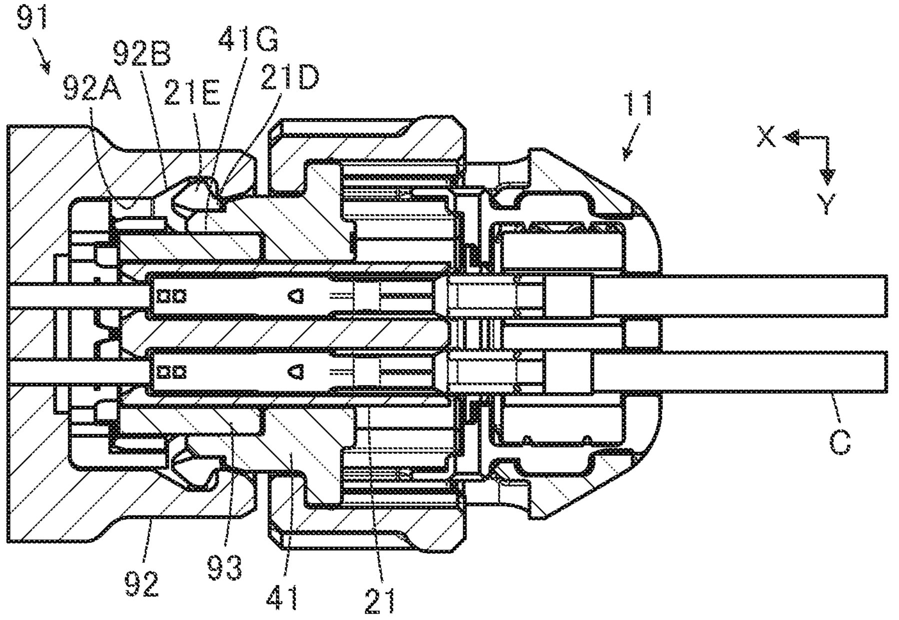
FIG. 35 is a cross-sectional view showing the connector according to Embodiment 1 and the counter connector when fitting is completed in a cross section corresponding to line A-A of FIG. 2.

When the connector 11 is further moved in the +X direction, the distance between the tips of the pair of leg portions 41D of the slider 41 is widened in the Y direction by the leg portion deformation portion 21H of the housing 21 whereby the abutment of the pair of leg portions 41D against the retainer 93 is released, and as shown in FIG. 34, the slider 41 slides in the +X direction due to a restoring force of the elastic member 61. At this time, the projections 21E of the lock pieces 21D of the housing 21 are accommodated in the groove 92B of the connector accommodating portion 92A, so that the connected state is established between the contacts 71 of the connector 11 and the contacts 94 of the counter connector 91 as shown in FIG. 35. Thus, fitting of the connector 11 to the counter connector 91 is completed.

Further, at this time, the blocking beams 41G of the slider 41 are inserted between the retainer 93 and the lock pieces 21D, and owing to this, the projections 21E of the lock pieces 21D are prevented from coming off the groove 92B of the connector accommodating portion 92A even when a force to pull the connector 11 from the counter connector 91 acts. Thus, the fitted state between the connector 11 and the counter connector 91 is maintained.

If a fitting force to push the connector 11 toward the counter connector 91 in the +X direction is released before the projections 21E of the lock pieces 21D of the housing 21 are fully accommodated in the groove 92B of the connector accommodating portion 92A, the housing 21 moves in the −X direction with respect to the slider 41 due to a restoring force of the elastic member 61, so that the connector 11 is separated from the counter connector 91. In other words, an automatic incomplete-fitting rejection function of the connector 11 with respect to the counter connector 91 is exhibited.

Figure 3:
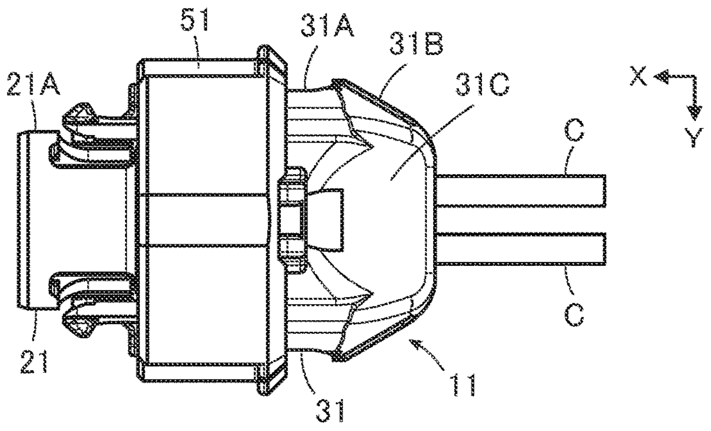
FIG. 3 is a plan view showing the connector according to Embodiment 1.
Figure 4:
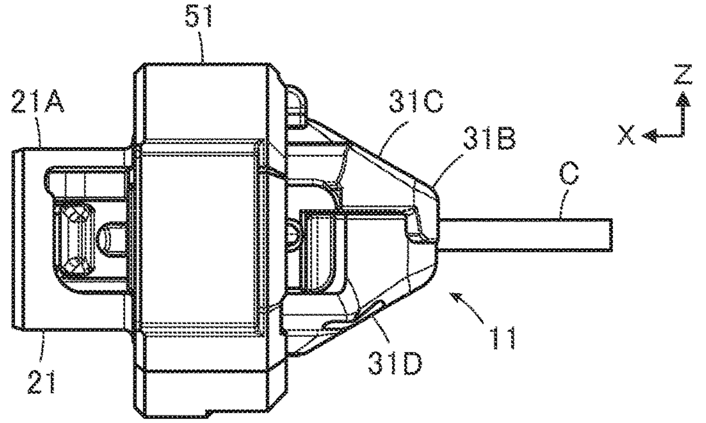
FIG. 4 is a side view showing the connector according to Embodiment 1.
Figure 5:
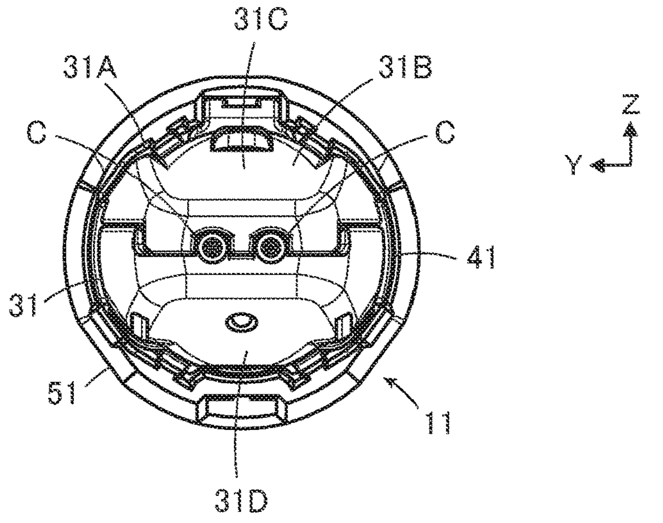
FIG. 5 is a back view showing the connector according to Embodiment 1.

The connector 11 is to be fitted to the counter connector 91 in this manner; as shown in FIGS. 3 to 5, the cover member 31 of the connector 11 has the fitting force applying portion 31B protruding in the −X direction, i.e., rearward, the fitting force applying portion 31B has the first outer surface 31C and the second outer surface 31D that are inclined to approach each other toward the −X direction, and the electric wires C extend in the −X direction from between the first outer surface 31C and the second outer surface 31D.

Therefore, the operator carrying out the fitting operation of the connector 11 can apply a fitting force to the connector 11 to push the connector 11 toward the counter connector 91 by putting the operator's fingers such as, for example, an index finger and a thumb on the first outer surface 31C and the second outer surface 31D of the fitting force applying portion 31B of the cover member 31 and pushing the connector 11 in the +X direction.

The first outer surface 31C of the cover member 31 forms a flat inclined surface facing the −X direction and the −Z direction, and the second outer surface 31D forms a flat inclined surface facing the −X direction and the +Z direction; owing to this configuration, when the operator applies a fitting force acting in the +X direction to the first outer surface 31C and the second outer surface 31D, components of force acting in the Y direction along the first outer surface 31C and the second outer surface 31D are not easily generated, so that the connector 11 is less prone to tilt in the Y direction. Thus, it is possible to effectively prevent generation of an incomplete fitting state where, of the projections 21E of the pair of lock pieces 21D of the housing 21 that are spaced apart from each other in the Y direction, only either one is accommodated in the groove 92B of the counter connector 91.

Thus, the connector 11 according to Embodiment 1 can prevent oblique fitting from easily occurring while having the automatic incomplete-fitting rejection function because the cover member 31 has the first outer surface 31C and the second outer surface 31D that are spaced apart from each other in the Z direction (second direction) perpendicular to the Y direction (first direction) in which the pair of lock pieces 21D of the housing 21 are spaced apart from each other and that are inclined to approach each other toward the rear end of the cover member 31.

To detach the connector 11 being fitted with the counter connector 91 from the counter connector 91, it suffices if the collar member 51 disposed outside the cover member 31 and the slider 41 is moved back in the −X direction. When the collar member 51 is moved back in the −X direction, the step portions 51A formed on the inner periphery of the collar member 51 catch on the grip portions 41C of the slider 41, so that the slider 41 slides in the −X direction along with the collar member 51. Consequently, the blocking beams 41G of the slider 41 inserted between the retainer 93 of the counter connector 91 and the lock pieces 21D of the housing 21 are pulled out in the −X direction.

In this state, when the collar member 51 is further moved back in the −X direction, the housing 21 is pulled in the −X direction along with the slider 41, and the projections 21E of the lock pieces 21D come off the groove 92B of the connector accommodating portion 92A. Thus, the fitting of the connector 11 with respect to the counter connector 91 can be released.

Since the connector 11 according to Embodiment 1 has the ring-shaped collar member 51 covering the outer peripheries of the cover member 31 and the slider 41, the operation of detachment from the counter connector 91 can be carried out by moving the collar member 51 back in the −X direction.

Embodiment 2

Figure 36:
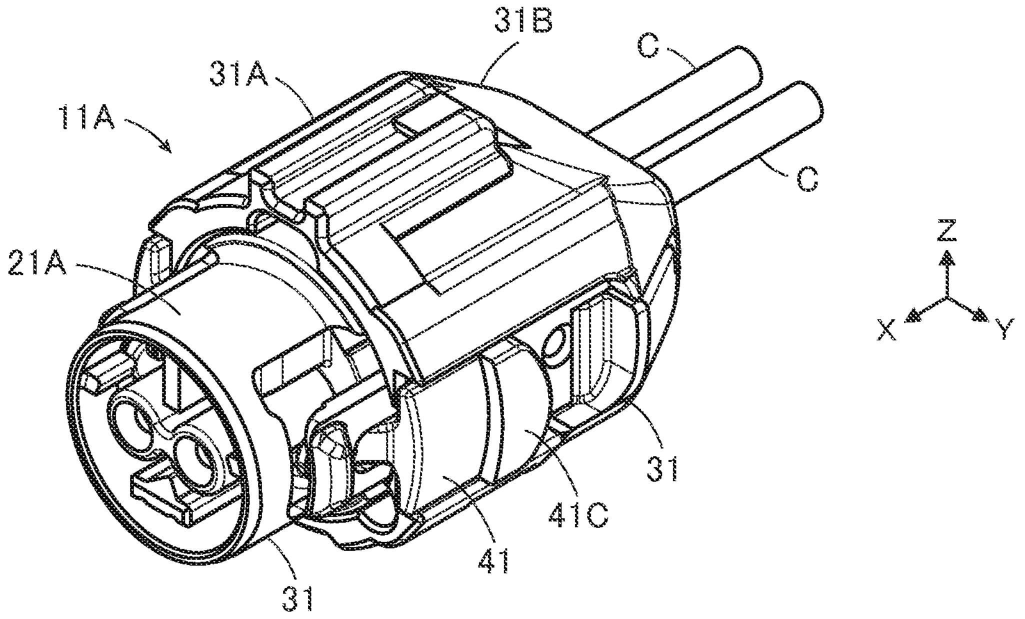
FIG. 36 is a perspective view showing a connector according to Embodiment 2.
Figure 37:
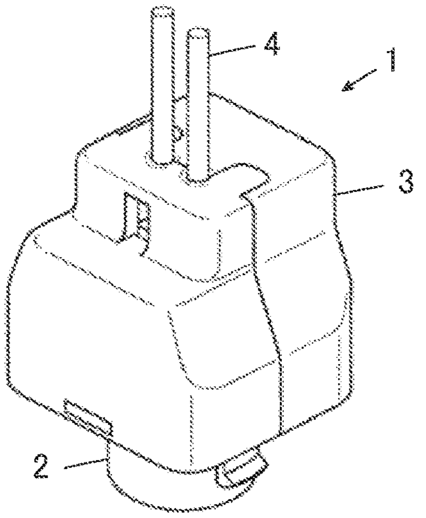
FIG. 37 PRIOR ART
FIG. 37 is a perspective view showing a conventional connector.
Figure 38:
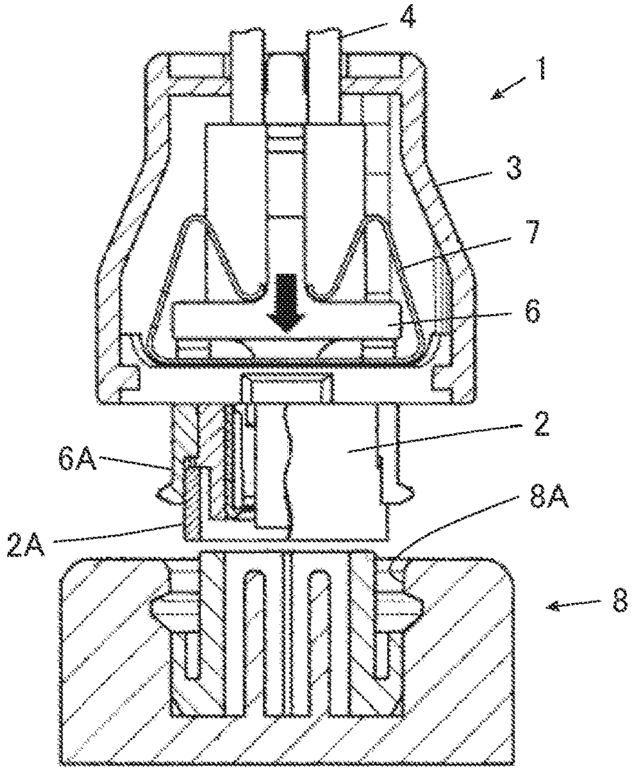
FIG. 38 PRIOR ART
FIG. 38 is a cross sectional view showing the conventional connector before fitting.
Figure 39:
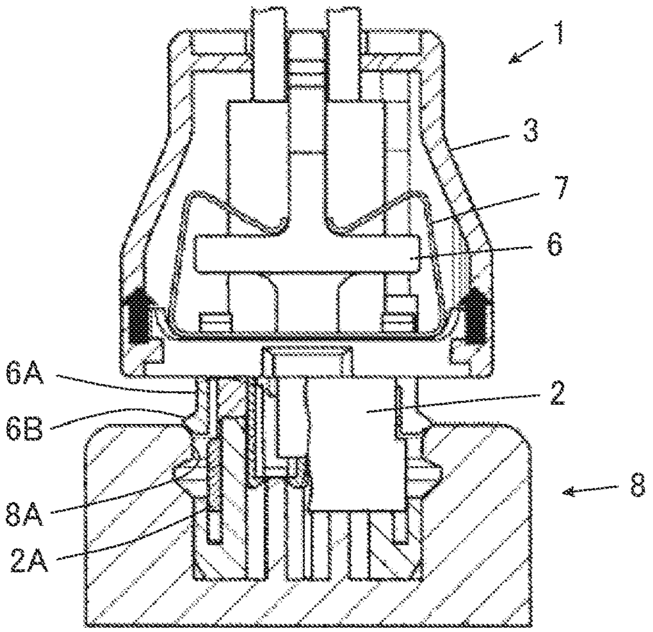
FIG. 39 PRIOR ART
FIG. 39 is a cross-sectional view showing the conventional connector in the middle of fitting.
Figure 40:
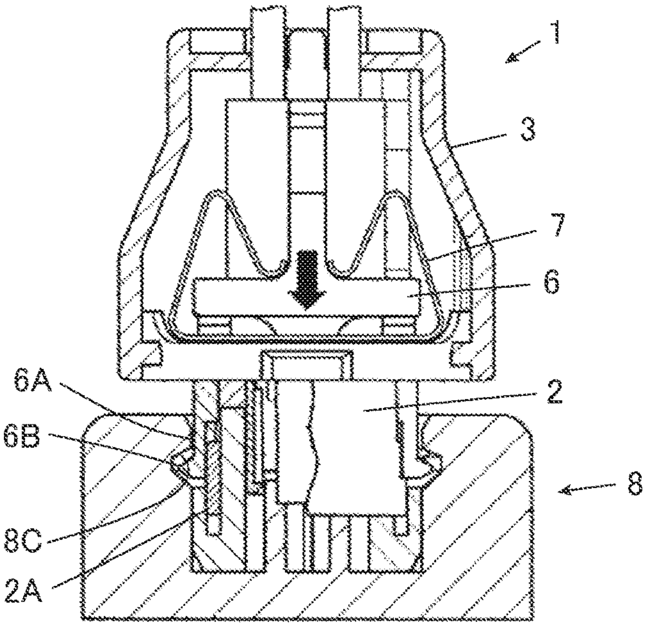
FIG. 40 PRIOR ART
FIG. 40 is a cross-sectional view showing the conventional connector when fitting is completed.

FIG. 36 shows a connector 11A according to Embodiment 2. The connector 11A is the one in which the collar member 51 is omitted in the connector 11 according to Embodiment 1 shown in FIGS. 1 to 5 and the outer peripheries of the cover member 31 and the slider 41 are bared, and the connector 11A has the same configuration as that of the connector 11 according to Embodiment 1 except for the collar member 51.

The connector 11A according to Embodiment 2 can be fitted to the counter connector 91 by putting the operator's fingers on the first outer surface 31C and the second outer surface 31D of the fitting force applying portion 31B of the cover member 31 and applying a fitting force acting in the +X direction toward the counter connector 91, as with the connector 11 according to Embodiment 1.

The fitting operation of the connector 11A with respect to the counter connector 91 is the same as that of the connector 11 according to Embodiment 1 shown in FIGS. 28 to 35.

To detach the connector 11A being fitting with the counter connector 91 from the counter connector 91, it suffices if the operator puts the operator's fingers on the pair of grip portions 41C of the slider 41 and moves the slider 41 back in the −X direction. When the slider 41 is slid in the −X direction, the blocking beams 41G of the slider 41 inserted between the retainer 93 of the counter connector 91 and the lock pieces 21D of the housing 21 are pulled out in the −X direction, and when the slider 41 is further pulled in the −X direction, the housing 21 moves back in the −X direction, and the projections 21E of the lock pieces 21D come off the groove 92B of the connector accommodating portion 92A. Thus, the fitting of the connector 11 with respect to the counter connector 91 is released.

Since the connector 11A does not have the collar member 51 provided in the connector 11 according to Embodiment 1, it is necessary to apply a force to the pair of grip portions 41C of the slider 41 such that the slider 41 is moved back in the −X direction when the connector 11A in the fitting state is detached from the counter connector 91, and this may relatively deteriorate the operability for detachment. However, not having the collar member 51 results in a smaller size of the connector 11A than that of the connector 11 according to Embodiment 1, and this is helpful when an installation space is tight.

Although the connector 11 according to Embodiment 1 has a larger size than that of the connector 11A because of the collar member 51, the connector 11 has excellent operability for detachment compared to the connector 11A according to Embodiment 2 since the operator can grasp the ring-shaped collar member 51 larger than the slider 41 to move the collar member 51 back in the −X direction in detaching the connector 11.

Thus, it is desirable to select one of the connector 11 according to Embodiment 1 and the connector 11A according to Embodiment 2 depending on an installation space and other factors.

In Embodiments 1 and 2 above, it is not always necessary to arrange the first outer surface 31C and the second outer surface 31D spaced apart from each other in the Z direction in a symmetrical manner with respect to an XY plane. However, arrangement of the first outer surface 31C and the second outer surface 31D in a symmetrical manner with respect to an XY plane is preferred because the connector 11, 11A is less prone to tilt in the Z direction when the operator puts the operator's fingers on the first outer surface 31C and the second outer surface 31D and pushes the connector 11, 11A in the fitting direction.

It should be noted that while the two electric wires C extend from the rear end of the cover member 31 in the −X direction in parallel to the fitting direction in Embodiments 1 and 2 above, the invention is not limited thereto. For example, there may be provided a so-called angle-type connector in which an electric wire C extends from the rear end of the cover member 31 in the Z direction or the Y direction perpendicular to the fitting direction as long as the cover member 31 has the first outer surface 31C and the second outer surface 31D that are spaced apart in the direction perpendicular to the direction in which the pair of lock pieces 21D of the housing 21 are spaced apart and that are inclined to approach each other toward the rear end of the cover member 31.

The number of the electric wires C is not limited to two, and one or three or more electric wires C may be connected to the connector 11, 11A.

While the connectors 11 and 11A to be fitted to the counter connector 91 having the inflator 92 and the retainer 93 which constitute a part of an airbag system are described in Embodiments 1 and 2 above, the invention is not limited thereto and is applicable to various types of connectors having an automatic incomplete-fitting rejection function.

What is claimed is:

1. A connector to be fitted to a counter connector by being moved frontward along a fitting direction, the connector comprising:

a contact coupled with an end of an electric wire;

a housing retaining the contact;

a cover member retaining the housing;

a slider retained in the housing to be slidable along the fitting direction; and an elastic member disposed between the cover member and the slider and applying to the slider an elastic force acting along the fitting direction, wherein the housing includes a pair of lock pieces that are arranged to be spaced apart from each other in a first direction perpendicular to the fitting direction and that lock a fitting state between the connector and the counter connector by being fitted in the counter connector, and the cover member has a pair of outer surfaces that are spaced apart from each other in a second direction perpendicular to both the fitting direction and the first direction and that are inclined to approach each other toward a rear end of the cover member.

2. The connector according to claim 1, wherein the pair of outer surfaces are disposed to be symmetrical with respect to a plane extending along both the fitting direction and the first direction.

3. The connector according to claim 2, wherein the electric wire coupled with the contact extends rearward along the fitting direction from between the pair of outer surfaces at the rear end of the cover member.

4. The connector according to claim 3, wherein the cover member includes a first cover and a second cover that are disposed on opposite sides of the electric wire to sandwich the electric wire therebetween and that are able to be joined to each other, and the pair of outer surfaces are constituted of a first outer surface disposed in the first cover and a second outer surface disposed in the second cover.

5. The connector according to claim 4, comprising a pair of the contacts coupled with the ends of the corresponding electric wires and disposed parallel to each other.

6. The connector according to claim 1, wherein the housing includes a front tubular portion that extends frontward along the fitting direction beyond a front end of the cover member and that is to be inserted inside the counter connector when the connector is fitted to the counter connector, the contact is disposed inside the front tubular portion, and the pair of lock pieces extend frontward along the fitting direction on an outside of the front tubular portion.

7. The connector according to claim 1, wherein the slider includes a pair of blocking beams that serve to prevent deformation of the pair of lock pieces by contacting or approaching the pair of lock pieces when the connector and the counter connector are in a completely fitted state.

8. The connector according to claim 1, wherein the slider includes a pair of leg portions that extend frontward along the fitting direction and that are elastically deformable, and the housing includes a leg portion deformation portion that contacts tips of the pair of leg portions in response to a slide position of the slider and elastically widens a distance between the pair of leg portions.

9. The connector according to claim 1, wherein the slider has a grip portion that is grasped when the slider is moved rearward in the fitting direction with respect to the housing.

10. The connector according to claim 1, comprising a collar member of ring shape that surrounds an outer periphery of the cover member and that is disposed to be slidable in the fitting direction with respect to the cover member, wherein the collar member includes a step portion that is disposed on an inner periphery thereof and that catches on the slider in the fitting direction, and when the collar member is moved rearward in the fitting direction with respect to the cover member, the step portion catches on the slider so that the slider together moves back.

* * * * *